United States Patent

[11] 3,600,820

| [72] | Inventor | Lloyd D. Klein<br>Toronto, Ontario, Canada |
|---|---|---|
| [21] | Appl. No. | 840,002 |
| [22] | Filed | July 8, 1969 |
| [45] | Patented | Aug. 24, 1971 |
| [73] | Assignee | Lloyd D. Klein Industrial Electronics<br>Limited<br>Toronto, Ontario, Canada |

[54] AUTOMATIC CONTROL FOR GRAIN DRIERS
1 Claim, 3 Drawing Figs.

| [52] | U.S. Cl. | 34/48,<br>34/174 |
|---|---|---|
| [51] | Int. Cl. | F26b 19/00 |
| [50] | Field of Search | 34/28, 30,<br>48, 174 |

[56] References Cited
UNITED STATES PATENTS

| 2,968,874 | 1/1961 | Fishburn | 34/48 |
|---|---|---|---|
| 3,053,522 | 9/1962 | Applegate | 34/174 X |
| 3,400,466 | 9/1968 | McClaren | 34/174 X |

*Primary Examiner*—Carroll B. Dority, Jr.
*Attorney*—Rogers, Bereskin & Parr

ABSTRACT: A grain drier for reducing the moisture content of grain. The drier comprises a vertical column that is supplied with hot air from an air heater, for heating grain which passes downwardly through the column. The grain temperature, and hence the moisture content, is controlled by a temperature control which has a probe for continuously deriving an electronic signal proportional to the grain temperature. An electronic control compares the signal with a reference signal and operates a valve which controls the flow of fuel to the air heater to maintain the grain temperature at a predetermined temperature corresponding to the reference signal.

INVENTOR.
LLOYD D. KLEIN

PATENTED AUG 24 1971 3,600,820

INVENTOR.
LLOYD D. KLEIN

BY Rogers, Bereskin, & Parr

AUTOMATIC CONTROL FOR GRAIN DRIERS

This invention relates to a drier for materials such as grain.

When grain is harvested, its moisture content is often above an acceptable level for storage so that the harvested train must be passed through a grain drier to bring the moisture content down to a predetermined level (usually about 15 percent) before the grain is stored. Basically, the grain drier usually consists of a vertical column down which the grain falls onto a powered auger which moves the dried grain onto a conveyor. The column has a hot upper portion through which a blast of hot air passes horizontally to dry the grain, and a cool lower portion through which cold air is passed to cool the grain. The grain is then moved by the auger and conveyor to a storage area. Because the moisture content of the harvested grain varies, the temperature of the blast of hot air must be regulated so that the moisture content of the grain is reduced to the predetermined level. This temperature regulation is done by an operator who first checks the temperature of a sample of grain as it leaves the hot upper portion of the column. The temperature is an indication of the moisture content because the grain gives off moisture as it heats up. The operator then adjusts the hot air temperature and/or the speed of the auger according to tables accumulated from experience with a particular drier. If the moisture content is too high the air temperature is increased and vice versa. The auger speed is varied because the air temperature is normally limited to a maximum of 220° Fahrenheit, so that for very damp grain the air is at its maximum temperature and the auger is slowed down to expose the grain to the hot air for a longer period.

The air heater is usually gas fired since gas flow is comparatively easy to regulate. The hot air temperature is proportional to the rate of flow of gas reaching the burner so that the air temperature is regulated by a gas flow control valve in the gasline to the burner. The valve responds to an electrical signal from a variable resistor operated by a bimetallic strip on the variable resistor can be adjusted to correspond to a selected hot air temperature such that when the air temperature is the same as the selected hot air temperature there is no signal to the control valve. However, as the hot air temperature varies from the selected temperature, the bimetallic strip moves over the resistor to change the electrical signal to the control valve. This control simply maintains the hot air temperature at a selected value and it does not take into consideration the continuous variation in the moisture content of the grain as it passes through the column.

The operator must set the selected air temperature according to the moisture content of the grain sample he takes from near the bottom of the hot upper portion of the column as previously described. The actual control of the moisture content is therefore directly proportional to the frequency of his samples (because the content is continuously changing), the accuracy with which he measures the temperature of his sample, and the accuracy of the tables he uses to reset the air temperature and auger speed (when required). The time taken to prepare a sample and check its moisture content also causes errors so that there is a definite possibility that inaccuracy in the control of the moisture content may result in some of the grain being fed through the drier more than once before it has the required moisture content.

It has been found that it is possible to control the moisture content of the grain by measuring the temperature of the grain as it passes through the lower part of the hot upper portion of the column, and use this grain temperature to automatically and continuously control the flow of gas supply to the air heater to maintain the temperature and hence the moisture content of the grain at a selected level.

In its preferred form, the invention consists of a grain drier having a vertical column which has a hot upper portion and a cool lower portion. The column is bounded on opposite sides by parallel perforated plates to allow hot air to be drawn across the hot upper potion, and cold air to be drawn across the cool lower portion. A sensitive thermocouple is attached to one of the perforated plates near the bottom of the upper portion to produce an electrical signal which is proportional to the actual temperature of the hot grain. The signal from the thermocouple is fed to a sensitive control unit which compares the signal (and hence the actual grain temperature), with a selected setting on a dial marked in grain temperature. If the actual grain temperature is not the same as the selected grain temperature the control unit adjusts the gas control valve to change the hot air temperature accordingly and thereby bring the actual grain temperature back towards the selected grain temperature. This control is continuous so that as soon as such changes in grain temperatures are detected, the air temperature is adjusted accordingly. Because the moisture content of the grain is reflected in its temperature, the grain temperature gives a close indication of the moisture content of the grain as the grain passes the sensitive thermocouple.

In the drawings which illustrate a preferred embodiment of the invention:

Figure 1:
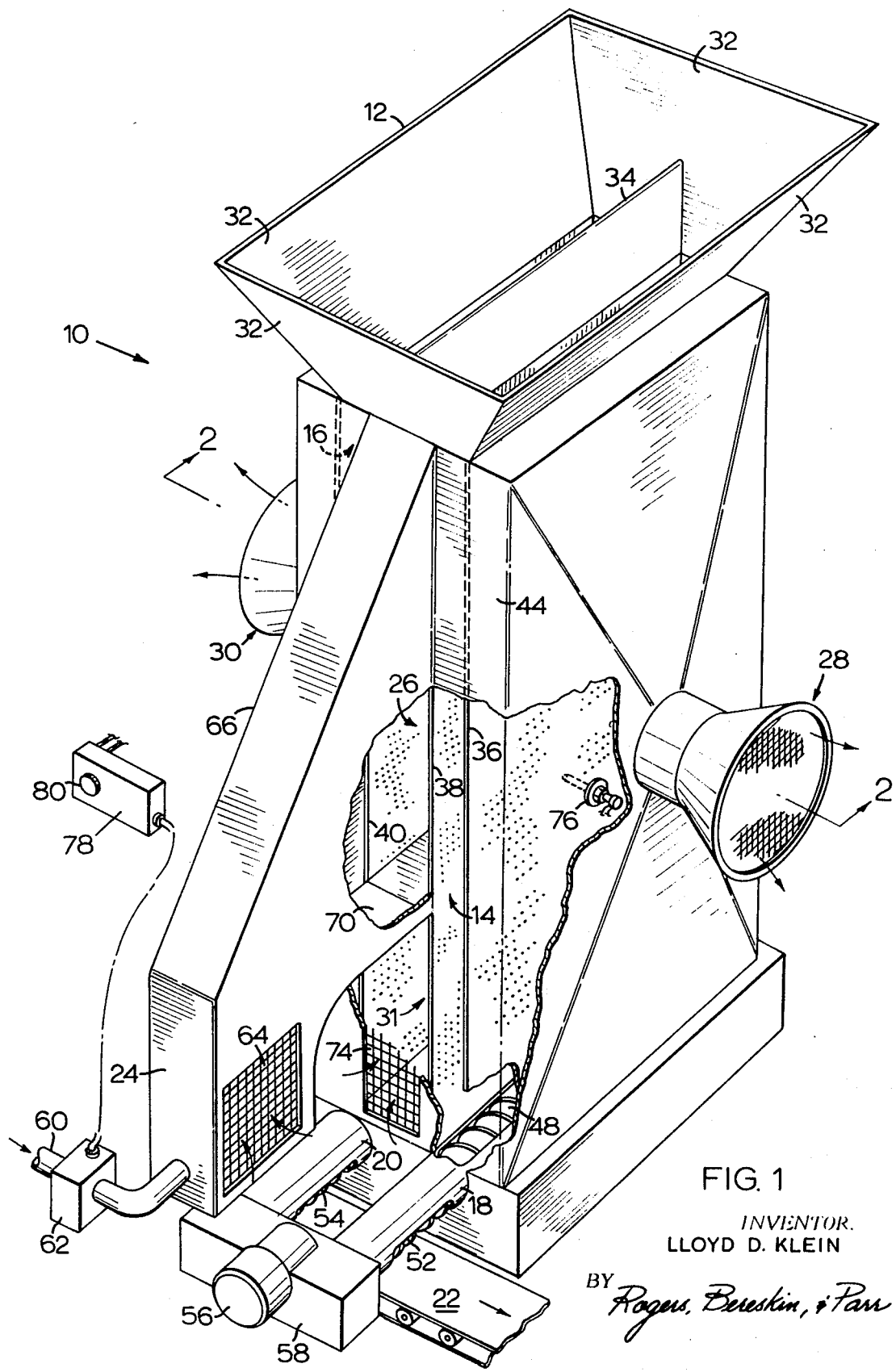
FIG. 1 is a diagrammatic representation of a grain drier according to the invention.

Reference is first made to FIG. 1 which shows a grain drier indicated generally by the numeral 10. The grain drier 10 includes a grain feed system and an air feed system for drying and cooling the grain. The grain feed system consists of a hopper 12 which is filled with grain to feed a pair of similar vertical columns 14 and 16 each of which contains a hot upper portion and a cool lower portion. The grain then passes into a pair of motor-driven augers 18 and 20 respectively, which feed the dried grain to a conveyor system 22 which then delivers the grain to a storage area (not shown). The air system consists of a gas heater 24 which feeds hot air to a hot air duct 26 between the columns 14 and 16. The hot air is drawn across the falling grain in the upper portion of the columns 14 and 16 by a pair of fans 28 and 30 respectively which exhaust the moisture-bearing air to atmosphere. The fans 28 and 30 also draw cold air into the cold air duct 31 and across the lower portion of the grain columns 14 and 16 to cool the grain after it is dried by the hot air.

Figure 2:
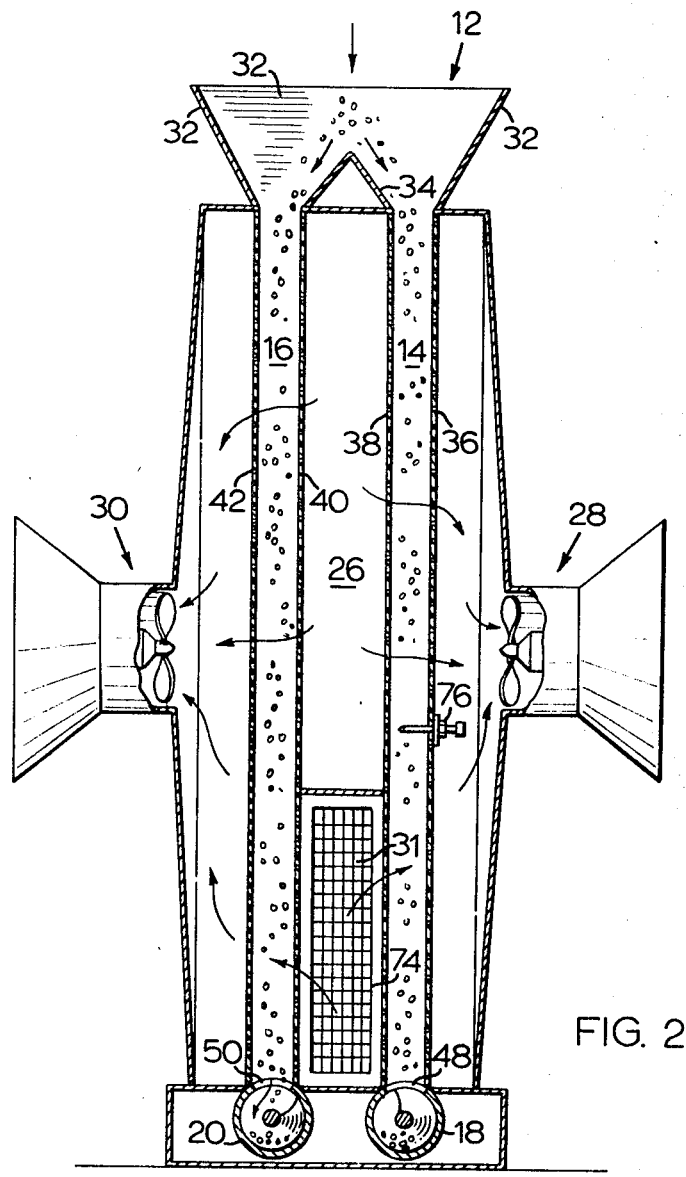
FIG. 2 is a partial sectional view on line 2—2 of FIG. 1.

Reference is now made to FIGS. 1 and 2 to more fully describe the grain feed system. The hopper 12 has inwardly tapering walls 32 and a central ridge 34 for guiding the grain into the columns 14 and 16. Each of the columns 14 and 16 consists of a vertical rectangular passage having two main spaced-apart parallel perforated walls 36, 38 and 40, 42 (FIG. 2) respectively. The vertical columns 14 and 16 are completed by grain drier end walls 44 (FIG. 1) and 46, and the lower ends of the columns 14 and 16 terminate in auger inlets 48 and 50 (FIG. 2) respectively. The grain falls through the inlets 48, 50 and the motorized augers 18 and 20 move the gain horizontally and deposit it through auger outlets 52 and 54 respectively (FIG. 1) onto the conveyor 22 (FIG. 1). The augers 18, 20 are driven by a constant speed motor 56 and gearbox 58 (FIG. 1) having two output shafts, one for each auger.

Reference is now made to FIG. 1. The air system consists firstly of a hot air system, and secondly a cold air system. The hot air system consists of the gas heater 24 which is fed from a gas supply 60 through a control valve 62. Air for the gas heater is drawn in by the fans 28 and 30 through gas heater air inlets 64 (one of which is shown). The heated air is drawn upwardly by the fans 28, 30 into the heater plenum 66 and on into the hot air duct 26 which is bounded by the grain columns 14 and 16, the top of the drier, the drier end wall 46 and at its bottom by a wall 70. The hot air is then drawn through the upper portions of the perforated sides 36, 38, 40 and 41 respectively of the grain columns and the moisture-rich air exits through the fans 28 and 30 to atmosphere. The cold air system includes inlets 74 in the drier end walls 44, 46 (one of which is shown) through which cold air is drawn by the fans 28, 30. The air enters through the inlets 74 and passes into the cold air duct 31 below the wall 70. The cold air then proceeds through the grain columns 14 and 16 to cool the grain before leaving through the fans 28 and 30.

The grain drier 10 also includes a control system which comprises a sensitive thermocouple mounted on a probe 76, (as described below with reference to FIG. 3). The probe 76 is attached to the plate 36 near to the bottom of the hot upper portion of the column 14. Only one probe 76 is used in the drier since the shape of the hopper 12 is such that a batch of grain is fed to both columns simultaneously and consequently the grain in one column is characteristic of the grain in both columns. The thermocouple in the probe 76 sends an electrical signal, which is proportional to the actual grain temperature, to a control unit 78 which compares the signal (and hence the actual grain temperature) with a selected grain temperature set in the dial 80. If the actual grain temperature is not substantially the same as the selected temperature corresponding to a required moisture content, the control 78 activates an analog circuit which operates the gas control valve 62 to vary the rate of flow of gas to the heater 24, thereby changing the hot air temperature and therefore the actual grain temperature. The control 78 operates automatically whenever the actual grain temperature varies from the selected grain temperature so that the temperature is monitored and controlled quickly and continuously, thereby controlling the moisture content of the grain.

In operation, grain enters the top of the columns 14 and 16 and the hot air begins to vaporize moisture from the grain. Initially all of the heat is used to remove moisture, but as the grain falls, and the moisture content is reduced, more and more of the heat goes into heating the grain itself until a grain temperature is reached at the probe 76 which indicates a predetermined required moisture content. This grain temperature is generally about 140° F. The grain temperature is indicated at the control 78 (FIG. 1) on the dial 80 which as previously described also indicates the selected grain temperature.

Figure 3:
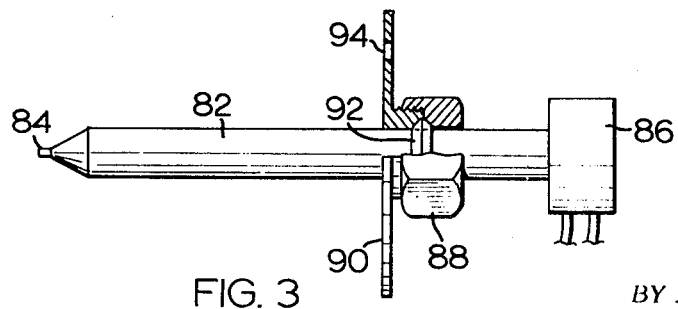
FIG. 3 is a partially sectioned view of a thermocouple according to the invention.

Reference is now made to FIG. 3 which shows a preferred embodiment of the temperature probe 76. The probe 76 consists of an elongated cylindrical body portion 82 having a leading end on which a sensitive thermocouple 84 is situated. The thermocouple 84, which is long compared with its diameter to ensure adequate contact between the falling grain and the thermocouple, is electrically connected through the elongated tube 82 inside insulation (not shown) to a connector 86 from which the conventional electrical connections are made to the control 78 (FIG. 1), which connections are not shown in the figures. The probe 76 can be adjusted by undoing a nut 88 to place the thermocouple 84 midway between the grain column plates 36 and 38. The nut 88 is threaded to an attachment plate 90 and surrounds a flexible annular ring 92 such that when the nut 88 is screwed onto the plate 90 the ring 92 is compressed radially inwardly to grip the tube 82. The probe 76 is attached to the wall 36 (FIG. 2) by screws (not shown) which pass through holes 94 in the attachment plate 90.

It has been found that after a short experimental period with a drier having constant speed augers, the required moisture content of the grain can be achieved by setting the temperature at a constant figure. Also, the drier controls allow hot air temperatures to be used which are higher than the previously accepted maximum since the maximum grain temperature is known and controlled whereas in previous driers the controls were such that the air temperature was limited to allow for errors in the control.

It was found in one typical drier according to the invention that the drier could handle up to 30 percent more grain than a comparable conventional drier, and that the air temperature used could exceed 300° F. without damaging the grain compared with a previously used maximum temperature of 220° F.

What I claim as my invention is:

1. A drier for grain or the like comprising:
   a. a generally vertical column through which said grain falls, said column having spaced-apart parallel perforated walls containing a hot upper portion and a cool lower portion;
   b. means for removing said grain from below said cool portion at a substantially constant speed; adjusted
   c. heater means for heating air;
   d. means for guiding hot air from said heater means to said hot upper portion;
   e. cold air inlet means for guiding cold air into said cool lower portion;
   f. fan means for forcing said hot air through said hot air guide means and through said hot upper portion to heat said grain thereby reducing the moisture content of said grain, and for forcing said cold air through said cool lower portion to cool said grain after said grain has passed through said hot upper portion;
   g. drier control means comprising:
      i. temperature probe means in said hot upper portion adjacent said cool lower portion and responsive to the temperature of said grain;
      ii. control means operatively connected to said probe means for continuously comparing said grain temperature with a predetermined grain temperature corresponding to a required grain moisture content; and
      iii. control valve means operatively connected to said control means and to said heater means for adjusting the flow of fuel to said air heater means as said grain temperature varies from said predetermined temperature, to thereby adjust said hot air temperature and maintain said grain at substantially said predetermined temperature corresponding to said moisture content.